United States Patent
Wartman

[11] 3,820,557
[45] June 28, 1974

[54] PROPORTIONING SYSTEM

[76] Inventor: Lloyd H. Wartman, 110 Greens Farm Rd., Westport, Conn. 06880

[22] Filed: Aug. 4, 1972

[21] Appl. No.: 278,119

[52] U.S. Cl. .................. 137/268, 169/15, 137/13
[51] Int. Cl. ............................................ A62c 15/16
[58] Field of Search .................... 137/13, 268, 604; 23/267 R; 169/1 A, 1 R, 14, 15; 239/310, 315

[56] References Cited
UNITED STATES PATENTS

| | | | |
|---|---|---|---|
| 564,615 | 7/1896 | Handly | 169/15 |
| 773,971 | 11/1904 | Nuhring et al. | 169/15 |
| 1,170,908 | 2/1916 | Houghton | 169/15 X |
| 1,981,623 | 11/1934 | Karter | 239/315 X |
| 2,304,867 | 12/1942 | Wenker | 239/315 X |
| 3,023,760 | 3/1962 | Dever et al. | 137/13 |
| 3,102,548 | 9/1963 | Smith et al. | 137/13 |
| 3,229,769 | 1/1966 | Bashaw et al. | 169/1 R |
| 3,307,567 | 3/1967 | Gogarty et al. | 137/604 X |
| 3,451,480 | 6/1969 | Zeh, Jr. et al. | 137/13 X |
| 3,520,313 | 7/1970 | Seymour | 137/13 |

*Primary Examiner*—Robert G. Nilson
*Attorney, Agent, or Firm*—Norman S. Blodgett; Gerry A. Blodgett

[57] ABSTRACT

This invention is a system for injecting a substance into a flowing stream of fluid; specifically, it is a system for increasing the water-carrying capacity of fluid systems by introducing a drag-reducing polymer into the turbulent aqueous stream in the system.

11 Claims, 6 Drawing Figures

PATENTED JUN 28 1974  3,820,557

PROPORTIONING SYSTEM

BACKGROUND OF THE INVENTION

The term "drag reduction," as it is known in the art, is the increase in volumetric flow rate of a fluid at constant pressure drop due to the addition (usually of a small amount, e.g. a hundred ppm or less) of a solid, linear polymeric material of relatively high molecular weight. Such material is known as the "drag reducing agent." The term "hydrodynamic drag reducing efficiency" as here used, is measured as the percent increase in the flow rate of treated water (which contains the hydrodynamic drag reducing agent) relative to the flow rate of untreated water (lacks the hydrodynamic drag reducing agent).

In the past few years considerable effort has been expended in attempts to device methods for introducing drag-reducing polymers into aqueous streams. For example, concentrated aqueous solutions of the drag reducing agent can be injected into the water stream to be treated. Since the drag-reducing polymer has its highest "hydrodynamic drag reducing efficiency" at concentrations of from 50 ppm to 200 ppm, it is convenient to make up a concentrated solution containing the percent or more of the drag reducing polymer and to inject this solution into the aqueous stream to be treated at a rate sufficient to yield the optimum concentration in the treated stream. However, this procedure has shortcomings. Poly(ethylene oxide) of molecular weight 4,000,000 is a very efficient drag-reducing polymer but, because of its high molecular weight, concentrated solutions are extremely viscous. solutions higher in concentration than one percent are difficult to pump with conventional equipment. Furthermore, the viscous concentrate does not mix readily with the aqueous stream to be treated. Also aqueous solutions of poly(ethylene oxide) degrade on storage and their hydrodynamic drag reducing efficiency is lost.

A more recent development is the use of slurries of drag reducing polymer in an organic solvent. For example, a slurry of a finely divided poly (ethylene oxide) can be prepared in a water-soluble carrier fluid such as propylene glycol. This slurry is injected into the aqueous stream to be treated. The particulate polymer particles dissolve in the water and impart the desired drag reducing effect. Slurries can contain 30 percent by weight or more of poly(ethylene oxide). Consequently, slurries require smaller storage containers for the amount of polymer required to treat a given volume of water than do aqueous stock solutions, where the maximum concentration which can be effectively utilized is one percent or less. The slurry system of introducing poly(ethylene oxide) into aqueous streams has been developed for use in fire fighting applications. The slurry can be dispensed from a container holding about 20 gallons carried on the fire truck. It is injected by mechanical pumping into the water at the suction side of the water impeller pump.

Another method of introducing poly(ethylene oxide) into an aqueous stream utilizes a tablet consisting of a physical mixture of poly(ethylene oxide) and a water-soluble organic or inorganic material, both ingredients in finely divided powdered form. The mixture is compressed into the tablets, preferably in the form of cylinders about one-half inch high and about one-half inch in diameter. Tablets of this type are placed in a canister and the canister, in turn, is inserted into the stream to be treated. Water flowing through the interstitial spaces between tablets causes them to dissolve. The water-soluble organic or inorganic ingredient accelerates the dissolution of the poly(ethylene oxide) and, by proper adjustment of the composition, the tablet size, and the canister dimensions, it is possible to achieve the optimum concentration of the poly(ethylene oxide) in the stream emerging from the canister.

Water soluble polymers other than poly(ethylene oxide) are also effective drag reducing agents when dissolved at low concentrations in aqueous streams. Polymers known to be effective are polyacrylamide, certain cellulose derivatives such as hydroxyethyl cellulose or methoxy cellulose, and certain polymers derived from natural products, e.g., guar gum or akra bean extract. In general the problems associated with practical use of these polymers are similar to those encountered with poly(ethylene oxide). In order to be an effective drag reducing agent, a polymer must be very high in molecular weight. Therefore aqueous stock solutions of concentrations high enough to be usable for injection into the aqueous stream to be treated are very viscous and difficult to pump.

Polyacrylamide and modified polyacrylamaides have been used extensively in water, primarily as flocculants to aid settling and filtration of suspended solids. One type of modified polyacrylamide which has been found to be particularly effective for certain types of treatment contains anionic groups attached to the polymer chain. These groups ionize in aqueous systems and electrostatic repulsion causes an expansion of the polymer chain. In water of low salt content these anionic polyacrylamides are more effective drag reducing agents than the unmodified polymer. At high salt contents, such as in sea water, the electrostatic repulsion effect is largely masked and the anionic polymers are not more effective than pure polyacrylamide.

The use of hydrodynamic drag reducing polymers to increase the water carrying capacity of fire protection and the like systems has been studied and consideration has been given to the methods above described to introduce the polymer into the aqueous stream. However, the problems associated with such systems are unique and each of the above-described methods has disadvantages. Most important is the fact that a sprinkler system must operate at 100 percent reliability when required. The use of pumps driven by electrical or other means is not desirable because of the likelihood of mechanical or electrical failure, especially during a fire. Injecting a slurry of drag reducing polymer or an aqueous solution requires some type of pumping and proportioning system. It does not appear possible to devise a system which does not require mechanical or electrical components or both to accomplish this. Consequently, methods based on slurries or aqueous stock solutions do not appear to be usable in automatic fire protection systems.

The method which employs tablets composed of poly(ethylene oxide) and a water-soluble ingredient is not open to the same objections. In a sprinkler system, a canister containing tablets of this type can be inserted directly in the line and water emerging from the canister will contain the drag reducing poly(ethylene oxide). The system is completely passive and no mechanical or electrical components are needed. A system of this type would appear to be especially applicable to dry-pipe and deluge systems as distinguished from wet-pipe sprinklers. Dry-pipe systems contain gas under pressure. Release of the gas on opening of a sprinkler valve causes a drop in internal pressure and this activates a valve which allows water to enter the system. The canister containing the tablets could be located directly on the dry side of the valve. In a deluge system all sprinkler heads are normally open and water is fed to the system via a valve which is actuated by a sensor which detects any heat source in the area to be protected. Here again, the canister containing the tablets can be located on the dry side of the valve. More complex plumbing would be required in a wet-pipe system, but it would not appear to be difficult to work out a system where the canister could be contained in a by-pass where it would be kept dry until water started flowing in the sprinkler piping.

A consideration of the hydrodynamic parameters involved suggests that the canister containing the tablets of drag reducing polymer should be about three times or more the diameter of the main sprinkler pipe it serves. Insertion of the canister in the line necessarily leads to some loss of pressure of water during its passage through the canister and its contents. The pressure loss is due to the circuitous path the water must traverse in flowing past the tablets. Also, on leaving the canister and entering the sprinkler piping, a pressure drop occurs due to the acceleration in water velocity necessitated by the decrease in pipe diameter. Inevitably, the pressure of the filled canister causes two opposing effects on the pressure profile in the sprinkler piping. At a constant pressure of feed water, a system containing a filled canister has a lower pressure than a similar system without a canister in the piping just beyond the canister. Because the filled canister introduces a drag reducing polymer, the pressure gradient in the piping beyond the canister is lower than in a similar case without a canister.

While the tablet method appears to be adaptable to use in fire protection systems, it has certain deficiencies. Most important, in dry-pipe and wet-pipe systems the amount of water which flows through the system depends on the number of sprinkler valves which have opened. Operating experience accumulated by the National Fire Protection Association over the period 1925–1964 shows that 37.6 percent of the fires required the opening of only one sprinkler head. 12.6 percent two sprinklers and 11.1 percent three heads. In some fires more than 100 sprinkler heads opened. This does not necessarily mean that 100 times as much water goes through the system when 100 sprinklers are open as with only one sprinkler. Pressure drops due to the increased flow cause reduced pressure at the sprinkler orifices and reduced flow through the sprinkler heads. It is obvious that the amount of water which flows through the canister may vary over a considerable range. In order to maintain optimum effectiveness as the number of sprinkler heads opening increases, the rate of dissolution of the tablets must increase proportionately to the rate of which water flows through the system. Experience indicates this is true, at least to a first approximation, especially for those tablets where the concentration of poly(ethylene oxide) in the tablets is 20 percent by weight or less. Tablets containing low concentrations of poly(ethylene oxide) ablate and dissolve in the aqueous stream at a rate which increases with increasing water flow rate. Data obtained over a three-fold range of flow rate indicate effective drag reduction is obtained at all flow rates in this range.

If the concentration of poly(ethylene oxide) in the tablets is increased to 50 percent by weight, a problem is noted. At low water flow rates tablets of this composition tend to swell by forming a water-containing gelatinous mass on their surface. The gelatinous layer fills the interstices between the tablets and the flow of water is impeded. The pressure drop across the canister increases and the pressure at the canister exit decreases. Hence, at a constant pressure head at the canister inlet, it is possible to so restrict flow as to negate the beneficial effect of the drag reducing agent and to actually reduce the flow through the system. For this reason, use of tablets containing as much as 50 percent poly(ethylene oxide) does not appear advisable.

The ablative tablet method has another important deficiency. The tablets gradually dissolve during use. They decrease in size and, as water flow continues, less surface area of the tablet material is available for dissolution. In order to maintain the concentration of poly(ethylene oxide) in the emergent stream reasonably constant with time, it is necessary to use an excess of tablets in the canister. For example, to treat 1,000 gallons of water with 50 ppm of poly(ethylene oxide), 0.42 lbs. of poly(ethylene oxide) is required. If the 1,000 gallons is to be pumped over a period of 30 minutes and a canister which utilizes only 0.42 lbs. of poly(ethylene oxide) is employed, the amount of poly(ethylene oxide) in the emergent stream would decrease with time because of the depletion of the canister contents. It would be better to start with 0.84 lbs. or a greater amount of poly(ethylene oxide) in the canister, so that only half of the contents would be gone in the 30 minutes of alloted time. An excess of poly(ethylene oxide) is needed to maintain the concentration of poly(ethylene oxide) in the emergent stream reasonably constant with time. The required excess of tablets is undesirable from both economic and technical standpoints. More tablets require a larger canister and hence, a greater pressure drop in the canister.

These and other difficulties experienced with the prior art devices have been obviated in a novel manner by the present invention.

It is, therefore, an outstanding object of the invention to provide a system for injecting drag-reducing agent into a stream so that the injection rate is proportional to the flow rate.

Another object of this invention is the provision of a system for injecting a drag reducing agent into a stream, wherein the agent is stored in a dry state until used and is thus not prone to degradation.

A further object of the present invention is the provision of a system for injecting a drag reducing agent into a stream in which complex pumping and piping systems are unnecessary.

A further object of the present invention is the provision of a system for injecting a drag-reducing agent into a stream, which does not tend to clog during operation.

It is another object of the instant invention to provide a system for injecting a drag-reducing agent into a stream which has an injection rate which is not time dependent during operation.

These and other objects in view, as will be apparent to those skilled in the art, the invention resides in the combination of parts set forth in the specification and covered by the claims appended hereto.

SUMMARY OF THE INVENTION

This invention involves a system for injecting a drag-reducing polymer into the water stream of an operating fire extinguishing sprinkler system or the like. Drag reducing polymers, i.e., susbstances which increase the flow of liquid in a pipe, are deposited on a structure in the flow, and the flow dissolves the polymer.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

It has now been discovered that the deficiencies inherent in the tablet system can be overcome by employing a coating of a polymer such as poly(ethylene oxide) on a rigid structure or structures placed in the flowing stream with the rigid structure so constructed that at least 80 percent of the total surface coated with poly(ethylene oxide) is a minimum of one-eighth inch distant from any other surface coated with poly(ethylene oxide).

The advantage of utilizing a surface coating of poly-(ethylene oxide) as compared with a tablet containing poly(ethylene oxide) is readily demonstrable from elementary considerations. In both cases water flow causes an ablation from the surface of the structure. However, as ablation takes place at the tablet surface, the size of the tablet decreases and consequently, the available surface area also decreases. The amount of poly(ethylene oxide) dissolving from the tablet decreases continuously as the tablet ablates. A surface coated with poly(ethylene oxide) ablates in the same fashion; however, in this case the area in contact with water remains constant until finally, the entire coating has dissolved. The concentration of poly(ethylene oxide) in the stream emerging from the above surface remains constant with time and no excess poly (ethylene oxide) need be present.

The requirement that the major portion of the exposed surface be at least one-eighth inch distant from any other portion of the surface is necessitated by the fact that the coating swells in contact with water. If surfaces are not maintained at least this distance from one another, swelling causes them to come in contact and these contacted areas become unavailable for further ablation or dissolution.

FIGS. 1, 2, 3 and 4 show a structure of the type which meets the requirement that 80 percent of the surface be at least one-eighth inch distant from any other surface.

Figure 1:
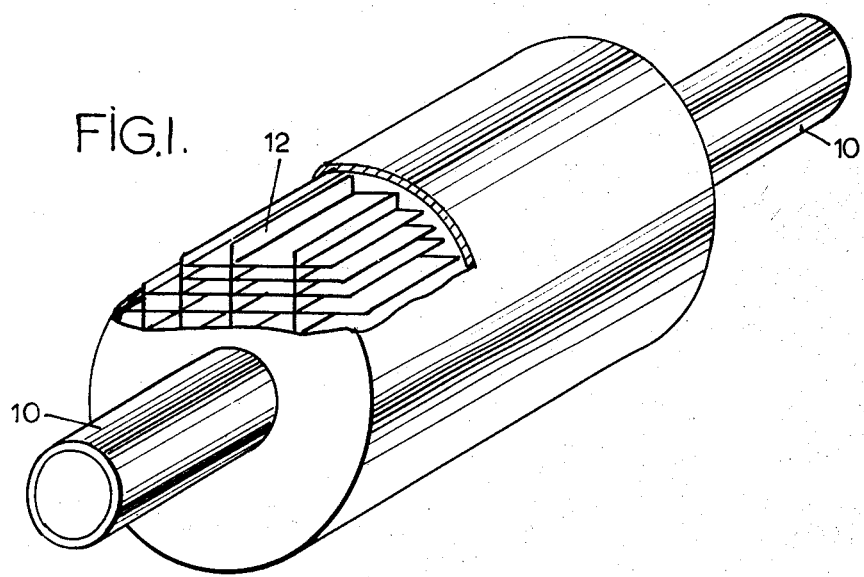
FIG. 1 is a perspective view of the canister and grid structure of the present invention, with the canister in partial section.
Figures 3, 4:
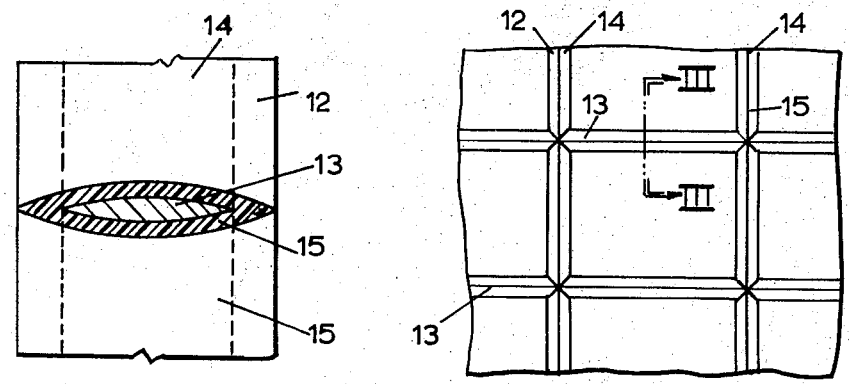
FIG. 3 is a side elevation view of the grid structure of the present invention.
FIG. 4 is a sectional view along the line III—III.

In FIG. 1 are shown a pipe 10 containing flowing water, a canister replacing a section of the piper 10, and a grid structure 12 through which water can flow. The structure 12 is constructed of horizontal and vertical rigid plates 13 and 14, arranged paralel to the water flow and of a shape which allows high surface area with low hydrodynamic resistance. The plates are spaced about one-fourth inch apart. The entire structure 12 is covered with poly(ethylene oxide) coating 15 of about 0.008 inch thickness. Several structures may be arranged in the cylinder, oriented to direct flow throughout the cylinder volume. FIGS. 3 and 4 show details of a grid structure. A similar effect is obtained by coated structures shown in FIGS. 5 and 6, namely a helix or a spiral. These structures can be used in a few large forms as is the grid, or in numerous small forms randomly oriented in the cylinder. They are perfectly constructed of metal but other rigid materials can be used.

The important characteristics of the support structure of this invention are that most of its surface is not opposed to another surface less than one-eighth inch away, the structure has high surface to volume ratio, and the surface area does not change rapidly with ablation of the surface. The nature of these characteristics is best understood by keeping in mind the objectives of this invention, namely design of a proportioning system having a low pressure drop which does not increase greatly if the ablating material becomes bloated, and having an ablation rate which increases with flow rate but does not change greatly with time.

Figure 2:
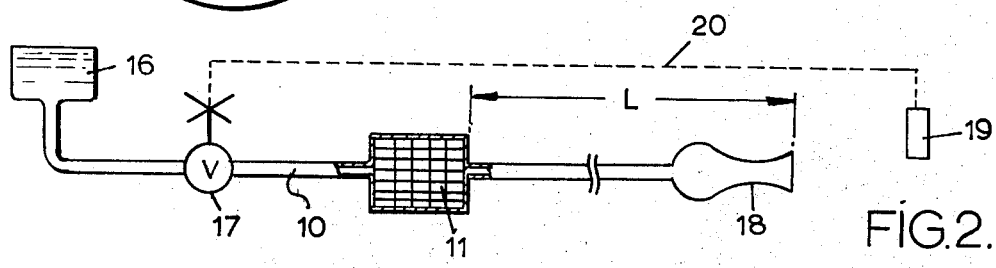
FIG. 2 is a diagrammatic representation of a fluid-flow system of the present invention.

The use of the present invention can be best understood by reference to FIG. 2 wherein is shown a fire fighting or extinguishing system using the principle of the present invention. The system is shown to include a source of water 16 and a long pipe line 10 with a nozzle 18 at the end opposite the source. At the source end of the pipe and in the stream line are a valve 17 which is normally closed, and a canister 11 containing a structure coated with the drag reducing agent. A fire sensor 19 is positioned downstream of the nozzle 18 and capable of causing valve 17 to open, if a fire is detected.

When a fire is detected by sensor 19, valve 17 is opened and water flow begins. The water passes through the canister 11 and through the structure. As it does it dissolves drag reducing agent from the structure. The water then flows down the length "L" of the pipe and exits the nozzle 18. As is well known, one of the effects of a pipe is to reduce the pressure of a fluid flowing through it. The size of this pressure reduction depends on the nature of the pipe and of the fluid. Furthermore, the amount of pressure drop is generally proportional to length "L." The effect of pressure drop is to reduce water flow rate through the pipe and lower output pressure at the nozzle. Both of these effects can be disastrous in a fire fighting situation. The drag reducing agent reduces pressure drop, for a given length of pipe, and thus allows delivery of more water at a higher pressure. It also reduces turbulence, resulting in a more coherent stream exiting the nozzle.

As already mentioned, many configurations which will fit into a cylindrical canister connected to the sprinkler piping can be devised. Probably the simplest method is to use conecntric tubes of increasing diameter, each tube coated both inside and outside with poly-(ethylene oxide). If the canister is to be 6 inches in diameter, coated metal tubes one-fourth inch, three-fourth inch, 1¼ inches and so on up to 5¾ inches in diameter might be used. The annular opening would be slightly less than one-fourth inch. Some type end fittings or internal spiders would be required to maintain this annular spacing.

Figure 6:
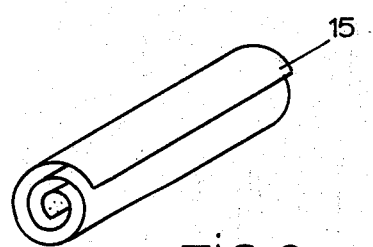
FIG. 6 is a perspective view of another possible structure of the present invention.

Another concept in many respects similar to the concentric tube system is to use a spiral as shown in FIG. 6. The spiral geometry has an advantage in that it is readily constructed from a flat sheet. A flat piece of metal sheet or foil is first coated on both sides with poly(ethylene oxide). The sheet is then wound allowing the desired spacing between successive wraps until the maximum dimension of the winding reaches the internal diameter of the canister. Metal or plastic honeycomb constructed from foil or sheet is also suitable. The honeycomb is oriented in the canister so that the close-packed hexagonal structural openings are at the entrance and exit of the canister.

Figure 5:
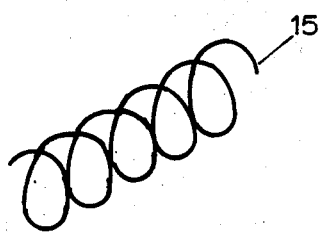
FIG. 5 is a perspective view of another possible structure of the present invention.

Another method found suitable is to use coils of wire formed in the shape of a helix as shown in FIG. 5. Random packings of coated coils of this type in a canister have been used. The diameter of the coils can be about one-fourth inch and successive turns are so spaced that there is at least one-eighth inch between successive wraps. The major advantage of this type construction is the simplicity of manufacture. Wire is readily coated by conventional means and winding into helical coils is easily accomplished using techniques developed for winding coil springs. The helical coils would be expected to yield a greater pressure drop in the canister than those systems previously described where the flow direction does not change within the canister (except at the ends). Hence, a system based on helical coils might be recommended where pressure drop in the canister is small compared to pressure drop in the piping system.

In order to obtain the desired improvement of water flow in sprinkler piping, it will be necessary to design the canister properly, as the dimensions of the canister together with the design and dimensions of the ablative element within the canister will affect the behavior of the system. Certain basic principles are applicable and these principles can be used to derive criteria on design. One might first consider the question of how much poly(ethylene oxide) should be used. Normally, fire protection experts plan for a sprinkler system to be in use for a maximum of thirty minutes during any single fire. Within thirty minutes, the fire is either quenched or it has gone out of control. The amount of poly(ethylene oxide) to be used in the canister can be calculated by multiplying the expected flow rate in gallons per minute by 30 to obtain the maximum expected water usage. This figure is then converted to pounds of water, and the required amount of poly(ethylene oxide) for 50 ppm dosage is obtained by multiplying the pounds of water by $50 \times 10^{-6}$. The thickness of the coating to be applied to the ablative element can then be readily calculated if the surface area to be used is known.

To illustrate, one might consider a sprinkler system which utilizes a 6 inch header line feeding branch lines of smaller dimensions. Assume that one wishes to achieve a maximum flow of 2,175 gallons per minute. (In normal 6 inch sprinkler piping with a Hazen-Williams coefficient of 120, this flow will result in a pressure drop of −0.15 psi per foot.) In 30 minutes the number of pounds of water flowing is 547,000. The required amount of poly(ethylene oxide) is 27.2 lbs. If a 0.008 inch coating on each side of the ablative element is used, the weight of the coating is 0.099 lbs. per square foot of the sheet or foil from which the ablative element is made. Consequently, a total area of 300 square feet of coated sheet is The 300 square feet of ablative element can be disposed in any of the geometric configurations previously described. If one were to use concentric tubes each 5 feet long, the first tube with a diameter of one-fourth inch, the second three-fourth inch and each successive tube a half-inch greater in diameter than the previous tube, it is readily calculable that the last tube should be 14¼ inch in diameter in order to achieve a total surface area of about 300 square feet.

These calculations are given merely to illustrate some of the considerations which must be taken into account in designing a system. There is no assurance that the design proposed above is the most suitable. It is important to keep in mind that one wants the coating to dissolve at a rate such that the coating will disappear entirely when water has flowed at a rate of 2,175 gallons per minute for 30 minutes. The rate of dissolution of the coating appears to depend on several factors among which is the velocity of the water in the canister. For a given flow rate of water through the 6 inch piping the velocity in the canister can be increased (while keeping the ablative coating area constant) by decreasing the diameter of the canister and increasing its length. Another possible recourse, if the coating is slow in dissolving, is to increase the available surface area while decreasing the coating thickness. This can be accomplished by decreasing the annular opening so that more concentric tubes can be inserted.

As has been pointed out in prior discussion, the ablative canister concept, whether it utilizes the tablet compositions of the prior art or the ablative surface coating contemplated in this invention, operates on the principle that the amount of drag reducing polymer removed from the ablating surface increases with increasing velocity of water in the canister containing the ablative material. If the ablation rate were independent of water velocity, one would expect to find high concentrations of the drag reducing polymer in the emerging water at low flow rates and low concentrations at high flow rates. Obviously, a system which behaved in this latter fashion would not be operable because the friction reduction effect is required at high flow rates (many sprinkler heads open) whereas it is not needed at low flow rates (few sprinkler heads open and little pressure drop in the system). In order to evaluate the ablative canister elements properly, therefore, one must ascertain their behaviour as a function of water velocity in the canister.

It is instructive to calculate the range of water velocities which might be encountered in a sprinkler system canister. In the table below this is done for various sizes of piping. For each pipe diameter the water flow rate which results in a 0.15 psi and a 0.40 psi pressure drop per foot of pipe is given. The data are taken from standard tables using a value of 120 for the Hazen-Williams coefficient. Canister diameter is assumed to be three times the pipe diameter. No correction is made for the physical volume occupied by the canister contents.

| Pipe | Canister | psi loss | Velocity in ft./sec. |
|---|---|---|---|

| Dia. (inch) | Diameter (inch) | per foot | GPM | in canister |
|---|---|---|---|---|
| 1 | 3 | 0.15 | 21.5 | 0.97 |
| 1 | 3 | 0.40 | 36.5 | 1.65 |
| 3 | 9 | 0.15 | 364 | 1.83 |
| 3 | 9 | 0.40 | 620 | 3.12 |
| 8 | 24 | 0.15 | 4500 | 3.18 |
| 8 | 24 | 0.40 | 7700 | 5.41 |

This table suggests the range of velocities which are of interest to evaluate in any test of an ablative material in a canister.

The total surface area which should be used in a canister can vary within wide limits, depending on the results one wishes to achieve in a particular application. There are several reasons for this. First, the concentration of poly(ethylene oxide) in water required to achieve an hydrodynamic drag reducing effect is not narrowly critical. Reduction of pressure drop can be detected at concentrations as low as one ppm. The pressure drop per unit length of conduit decreases as concentration increases with each successive increment of poly(ethylene oxide) concentration producing less effect than the preceding increment. The maximum drag reducing effect is imparted by concentrations in the range of 50 ppm to 200 ppm depending on the molecular weight of the poly(ethylene oxide) employed. If the optimum concentration is exceeded, a diminution of the drag reduction sets in because the viscosity of the solution increases. It is obvious that usable drag reduction effects can be achieved over a wide range of poly(ethylene oxide) concentrations in the water emerging from the canister. Lower concentrations of poly(ethylene oxide) in the emerging water will require less surface area and constructions of this type will be simpler and cheaper to build. Also, with less ablative surface area, pressure drop within the canister is lowered and this may be advantageous in some installations.

The required surface area may also be affected by the design of the canister. As explained above, with equal water passing through, the velocity in a canister of large diameter is less than in a longer canister of equal volume and lower diameter. Since ablation rate increases with water velocity, the larger diameter canister will require a larger ablative surface area than the canister of lower diameter to achieve an equal concentration of poly(ethylene oxide) in the emergent stream.

Coating thickness is also not narrowly critical. While coatings as thin as 0.001 inch are certainly capable of producing the desired effect, it is difficult to envision applications where the duration of the coating would be sufficient to suggest use of such a thin coat. It may be desirable to use coatings as thin as 0.003 inch in uses where a very large canister can be tolerated and high effectiveness would be achieved by using a large surface area. There is no upper limit to the coating thickness because surface area rather than thickness is the more important parameter. Practical and economic considerations suggest that a coating more than 0.050 inch thick would be impractical.

The coating of the components of the system with poly(ethylene oxide) canbe carried out by several alternative techniques. Poly(ethylene oxide) is soluble in many solvents at room temperature and soluble in other solvents at slightly elevated temperatures. Coatings can be formed by dissolving the polymer in a solvent such as benzene and applying the solution to the surface to be coated by brushing, dipping or spraying. This technique is not recommended, however, as solutions of poly(ethylene oxide) in the desired molecular weight range are extremely viscous and it is not easy to handle solutions much above one percent concentration. Many coats are required to build up the coating thickness to the desired level. Thicker coatings can be made more readily by preparing a slurry of the poly(ethylene oxide) powder in a solvent such as isopropanol which does not dissolve the polymer until the temperature is raised. A slurry of about 30 percent by weight poly(ethylene oxide) in isopropanol can be readily applied by brushing or dipping. Application is facilitated by incorporating a gelling agent of the fumed silica or modified bentonite type in the slurry. The coating is cured by briefly heating to a temperature of from 50 C to 80 C at which temperature the isopropanol solvates the polymer. Residual solvent is removed by evaporation for extended periods at slightly elevated temperatures. Solvents other than isopropanol which can be used are anisole, 1.4 dioxane, ethyl acetate, ethanol, n-butanol, n-butyl acetate, propylene glycol, etc. These solvents do not affect poly(ethylene oxide) at 25 C but dissolve the polymer at temperatures ranging from 40 C to 50 C.

Other techniques suitable for use in coating are fluidized bed coating and electrostatic powder coating. Coating techniques which utilize melt extrusion are not recommended because the molten polymer is extremely viscous and notoriously subject to degradation by the shearing action inherent in the extrusion process.

In all the examples described below the drag reducing efficiency of the system to be tested was evaluated by running water from a house spigot through a one-fourth inch copper line to a canister. Canisters of various dimensions were used. A pipe three-fourths inch in I.D. and one foot long was used in most experiments. Some experimentation was done with a three-fourths inch I.D. pipe, 3 ft. long. A 1 inch pipe, 12 inches long was also used. In every case the canister exited to 25 ft. of one-fourth inch copper tubing. Measuring the time required to fill calibrated containers sufficed to determine the flow rate. Pressure gauges were located at the canister inlet and outlet.

EXAMPLE 1

Helical coils of 18 gauge galvanized steel wire were made by wrapping the wire around a steel rod one-fourth inch in diameter. Successive wraps were so spaced that about two widths of wire separated successive wraps. A slurry of powdered poly(ethylene oxide) (the substance known as Polyox WSR–301 manufactured by Union Carbide Corporation) in isopropanol was made by adding sufficient isopropanol to achieve a honey-like consistency. The coils were dipped into this slurry, removed and immediately heated by connecting the ends of the coil to a 6-volt storage battery. Two coats were applied in this manner to each coil. Excess isopropanol was removed by gentle heating for 24 hours. The coating thickness was not measured.

Six coils of this type, each 6 inches long, were inserted into the three-fourths inch I.D. canister, 3 ft. long. The spigot was opened and adjusted to maintain a 9 psi pressure reading at the canister outlet. Flow rate data are compared to data previously obtained on water with no poly(ethylene oxide) in the canister.

| Time | Liters/minute | % Increase over water |
|------|---------------|----------------------|
| Start |  7.80 | 34 |
| 3 min. | 8.37 | 44 |
| 5 | 8.70 | 50 |
| 10 | " | " |
| 15 | " | " |
| 20 | " | " |
| 25 | " | " |
| 30 | " | " |

EXAMPLE 2

More helical coils were prepared as in Example 1 but this time the coils were cut into three-fourth inch lengths. The average coating thickness was measured and found to be 0.040 inch. Twenty-two short coils were placed in the three-fourths I.D., 12 inch long canister. Three separate experiments were carried out using canister exit pressures of 3, 9, and 27 psi. The tests were carried out at three pressures in order to ascertain the effect of velocity of water in the canister on the drag reducing effect. The velocity is calculated as for the equivalent empty canister. The velocities cover the range anticipated to be of interest in a canister for a sprinkler system as shown in the first table above. The fact that efficient drag reduction is obtained over a range of flow rates shows that the system is self-regulating. In other words, the amount of poly(ethylene oxide) dissolving increases with increasing velocity of water in the canister. As a result, efficient drag reduction is obtained over a range of flow rates. The slightly lower efficiency at the lowest flow rate is of no concern because the most efficient drag reduction in a fixed distribution system is required when flow rate is high and the system is operating at or near capacity.

| Time | Pressure (psi) | Liters/min. | Velocity (ft/sec) | % Increase over Water |
|------|----------------|-------------|-------------------|----------------------|
| Start | 3 | 3.90 | 0.75 | 19 |
| 3 min. | 3 | 4.12 | 0.79 | 26 |
| 7 | 3 | 4.20 | 0.81 | 28 |
| 12 | 3 | 4.20 | 0.81 | 28 |
| 17 | 3 | 4.20 | 0.81 | 28 |
| 22 | 3 | 4.20 | 0.81 | 28 |
| 27 | 3 | 4.20 | 0.81 | 28 |
| 32 | 3 | 4.20 | 0.81 | 28 |
| Start | 9 | 7.83 | 1.51 | 34 |
| 3 min | 9 | 8.10 | 1.56 | 39 |
| 8 | 9 | 8.37 | 1.61 | 43 |
| 13 | 9 | 8.37 | 1.61 | 43 |
| 21 | 9 | 8.37 | 1.61 | 43 |
| 28 | 9 | 8.37 | 1.61 | 43 |
| 33 | 9 | 8.37 | 1.61 | 43 |
| Start | 27 | 16.2 | 3.12 | 40 |
| 1 min | 27 | 16.2 | 3.12 | 40 |
| 3 | 27 | 16.2 | 3.12 | 40 |
| 6 | 27 | 16.2 | 3.12 | 40 |
| 11 | 27 | 16.2 | 3.12 | 40 |
| 16 | 27 | 16.2 | 3.12 | 40 |
| 21 | 27 | 16.2 | 3.12 | 40 |
| 26 | 27 | 16.2 | 3.12 | 40 |
| 31 | 27 | 16.2 | 3.12 | 40 |

EXAMPLE 3

A new slurry of powdered poly(ethylene oxide) was made up using 60 grams poly(ethylene oxide), 300 ml. of isopropanol, and 10.5 grams of modified bentonite (Bentone 27, manufactured by National Lead. The mixture of bentonite and isopropanol was first heated to 70° C and mixed in a Waring blender while hot. After cooling, the poly(ethylene oxide) was added and mixed. This slurry is suitable for coating with an ordinary paint brush. Three pieces of aluminum foil of a hard alloy type 0.005 inch thick and 6¾ inches long by 3¾ inches wide were coated on both sides. The coating was fused by gentle heating. The coating thickness was about 0.003 inch. After coating, the aluminum was formed into the shape of a spiral. One 3¾ inch edge was grasped in a vise to initiate the bending and was continued outside the vise to form a tight cylinder. On release, the aluminum sprang back to form a spiral shape with one-sixteenth inch free space between successive layers. The final pieces fitted snugly in the three-fourths inch I.D. pipe canister.

The flow rate with the three coated pieces of aluminum sheet in spiral form in the canister was measured, maintaining a 9 psi exit pressure. Erratic readings were obtained and the pressure at the canister inlet increased to high levels, then suddenly dropped and started again to increase. On completion of the run the canister was disassembled. Examination of the coated aluminum spirals revealed that swelling of the coating had taken place and that this had caused blockage because adjacent surfaces had swelled sufficiently to come into contact.

EXAMPLE 4

This experiment was carried out to ascertain what minimum spacing between successive layers in a spiral can be tolerated. A 1 inch I.D. pipe, 12 inches long was used as the canister. Three pieces of copper sheet about 6 inches long by 4¼ inches wide were coated on both sides with 0.003 inch of poly(ethylene oxide). Spirals were wound from each sheet forming the bends parallel to the 4¼ inch edge of the copper. Spacings between successive wraps were one-eighth inch in the first spiral, three-sixteenths inch in the second spiral, and one-fourth inch in the third. The 6 inch length of copper was sufficient to form a cylinder which fit nicely into the 1 inch I.D. canister when the one-eighth inch spacing was used. Spirals with larger spacings required shorter pieces and excess material was cut off. Each spiral was tested successively in the flow apparatus.

Spiral with one-eighth inch spacing between layers

| Time | Liters/min | Pressure Canister Inlet | Outlet |
|------|-----------|------------------------|--------|
| Start | 6.88 | 12.3 | 9.0 |
| 3 min | 7.32 | 12.3 | 9.0 |
| 8 | 7.83 | 12.8 | 9.0 |
| 13 | 7.83 | 12.8 | 9.0 |
| 18 | 7.83 | 12.5 | 9.0 |
| 23 | 7.83 | 12.8 | 9.0 |
| 28 | 7.83 | 12.8 | 9.0 |

Disassembly revealed no coalescence of adjacent layers. Therefore one-eighth inch spacing is sufficient.

Spiral with three-sixteenths inch between successive layers

| Time | Liters/min. | Pressure Canister Inlet | Outlet |
|------|-------------|------------------------|--------|
| Start | 6.88 | 12.0 | 9.0 |
| 5 min. | 7.34 | 12.2 | 9.0 |
| 10 | 7.56 | 12.3 | 9.0 |
| 15 | 7.56 | 12.3 | 9.0 |
| 20 | 7.56 | 12.3 | 9.0 |
| 25 | 7.56 | 12.3 | 9.0 |
| 30 | 7.56 | 12.3 | 9.0 |

Spiral with one-fourth inch between successive layers

| Time | Liters/min. | Pressure Canister Inlet | Outlet |
|---|---|---|---|
| Start | 6.32 | 11.7 | 9.0 |
| 4 min | 6.90 | 11.8 | 9.0 |
| 7 | 7.10 | 12.0 | 9.0 |
| 11 | 7.32 | 12.0 | 9.0 |
| 16 | 7.32 | 12.0 | 9.0 |
| 21 | 7.32 | 12.0 | 9.0 |
| 26 | 7.32 | 12.0 | 9.0 |
| 31 | 7.32 | 12.0 | 9.0 |

These data reveal two important effects. Note how the pressure drop across the canister decreases with increasing spacing in the spiral. Also, note that the drag reduction effect diminishes as the area of coated surface exposed to the water decreases.

EXAMPLE 5

Aluminum honeycomb with one-fourth inch spacing between parallel sides of the hexagons was coated by dipping and curing. The honeycomb was only available in three-eighths inch thick sections so seventeen pieces, 1 inch in diameter were assembled in the 1 inch canister to give a total effective length of between 6 and 7 inches. Care was used to align the openings in the honeycomb so as to present the minimum interference to flow.

| Time | Canister outlet pressure (psi) | Liters/min. | % Increase over water |
|---|---|---|---|
| Start | 9.0 | 8.10 | 39 |
| 5 min. | 9.0 | 8.70 | 50 |
| 10 | 9.0 | 8.70 | 50 |
| 15 | 9.0 | 8.70 | 50 |
| 20 | 9.0 | 8.37 | 44 |
| 25 | 9.0 | 8.37 | 44 |
| 30 | 9.0 | 8.38 | 44 |

EXAMPLE 6

Sheets of copper about 4 inches × 6 inches in size were coated with a high molecular weight anionic flocculant grade of modified polyacrylamide designated as Magnifloc 855A manufactured by American Cyanamid. The coating was accomplished by sprinkling a smooth thin layer of the powdered polymer on one surface of the sheet. Then water was carefully sprayed from an atomizing dispenser unto the polymer. On heating, the polymer coalesced and the water evaporated. The copper was bent into a spiral shape with one-eighth inch between successive layers and the final diameter of the spiral was 1 inch. Only one surface was coated because the coating is quite friable and, on bending, the coating on the outer radius broke and detached itself from the copper sheet. Three spirals of this type were prepared and inserted into a 1 inch × 12 inches canister. Data obtained with 9 psi pressure maintained at the canister exit are as follows:

| Time | Liters/min. | % Increase over water |
|---|---|---|
| Start | 6.66 | 14 |
| 5 min. | 6.85 | 18 |
| 10 | 6.66 | 14 |
| 15 | 6.66 | 14 |
| 20 | 6.85 | 18 |
| 25 | 6.85 | 18 |
| 30 | 6.85 | 18 |

EXAMPLE 7

Helical coils similar to those of Example 1 were made up and coated with Magnifloc 835A as in Example 6. The coils were used to fill a 1 inch × 12 inch canister and water flow rates data obtained in the usual fashion, maintaining a canister exist pressure of 9 psi.

| Time | Liters/minute | % Increase over water |
|---|---|---|
| Start | 6.87 | 18 |
| 2 min. | 7.80 | 34 |
| 5 | 7.80 | 34 |
| 10 | 7.80 | 34 |
| 15 | 8.10 | 39 |
| 20 | 8.10 | 39 |
| 25 | 8.10 | 39 |
| 30 | 8.10 | 39 |

It is obvious that minor changes may be made in the form and construction of the invention without departing from the material spirit thereof. It is not, however, desired to confine the invention to the exact form herein shown and described, but it is desired to include all such as properly come within the scope claimed.

While it will be apparent that the illustrated embodiments of the invention herein disclosed are well calculated adequately to fulfill the objects and advantages primarily stated, it is to be understood that the invention is susceptible to variation, modification, and change within the spirit and scope of the subjoined claims.

The invention having been thus described, what is claimed as new and desired to secure by Letters Patent is:

1. A system for injecting a substance into a fluid stream comprising
   a. a conduit in which the stream is confined and through which it flows in one direction,
   b. an inert structure positioned in said conduit and having a plurality of pairs of opposed parallel surfaces separated from each other and held parallel to the direction of flow, and
   c. a quantity of the substance to be injected into the stream deposited on said surfaces.

2. A system as recited in claim 1 wherein the conduit is part of and the fluid stream is the working fluid in a fire extinguisher sprinkler system.

3. A system as recited in claim 1 wherein the substance is a hydrodynamic drag reducing agent.

4. A system as recited in claim 1 wherein the substance is a high molecular weight polymer.

5. A system as recited in claim 1 wherein the substance is poly(ethylene oxide) having an average molecular weight greater than $1 \times 10^6$.

6. A system as recited in claim 1 wherein the substance is a poly(acrylamide) having an average molecular weight greater than $1 \times 10^6$.

7. A system as recited in claim 1, wherein the said distance is equal to or greater than one-eighth inch.

8. A system as recited in claim 1, wherein the substance is deposited on the surfaces to a thickness of 0.001 to 0.050 inches inclusive.

9. A system as recited in claim 1, wherein the said distance is ⅛ to ¼ inches inclusive.

10. A system as recited in claim 1, wherein each surface is connected to another surface thereby forming an angle, and at least half of the angles thus formed in the structure are greater than acute angles.

11. A system for injecting a substance chosen from the group consisting of polymers having a molecular weight greater than $1 \times 10^6$ into a fluid stream of a fire extinguishing system comprising
  a. a conduit in which the stream is confined and through which it flows in a direction,
  b. an inert structure positioned in said conduit and having a plurality of pairs of opposed parallel surfaces separated from each other by a distance of ⅛ to ¼ inch inclusive and held parallel to the direction of flow, each surface being connected to another surface by an angle greater than an acute angle, and
  c. a quantity of the substance to be injected into the stream deposited on said surfaces to a thickness of 0.001 to 0.050 inches inclusive.

* * * * *